(12) United States Patent
Sannomiya et al.

(10) Patent No.: US 7,511,260 B2
(45) Date of Patent: Mar. 31, 2009

(54) ENCODER DEVICE FOR DETECTING MOVEMENT

(75) Inventors: Hideaki Sannomiya, Atsugi (JP); Naosumi Waki, Atsugi (JP); Yuko Kimura, Atsugi (JP); Junichiro Tanaka, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 105 days.

(21) Appl. No.: 11/393,077

(22) Filed: Mar. 30, 2006

(65) Prior Publication Data
US 2007/0001107 A1    Jan. 4, 2007

(30) Foreign Application Priority Data
Jun. 29, 2005    (JP)    ............................. 2005-190137

(51) Int. Cl.
*G01D 5/34* (2006.01)
(52) U.S. Cl. ............................. 250/231.13; 250/231.14; 250/231.15; 250/231.16; 250/231.17; 250/231.18
(58) Field of Classification Search .. 250/231.1–231.18
See application file for complete search history.

(56) References Cited

U.S. PATENT DOCUMENTS 5,889,280 A * 3/1999 Matsuura ................ 250/237 G 6,545,262 B1 * 4/2003 Burgschat .............. 250/231.18
7,399,956 B2 * 7/2008 Wong et al. ............. 250/231.14
2003/0016369 A1 * 1/2003 Benner et al. ............... 356/616

FOREIGN PATENT DOCUMENTS

JP    6 18290    1/1994

* cited by examiner

*Primary Examiner*—Seung C Sohn
(74) *Attorney, Agent, or Firm*—Ladas & Parry LLP

(57) ABSTRACT

An encoder device includes first through fourth photodiodes each having a rhombus shape and a length of X1 in an X direction, the photodiodes being disposed adjacent to each other in the X direction such that a line passing through a pair of opposing vertices of the rhombus shape of each of the photodiodes is parallel to an X axis; a slit member that includes light transmitting sections and light shielding sections alternately arranged, and is movable in the X direction, each of the light transmitting and shielding sections having a length of 2×X1 in the X direction; and a logic circuit that generates first and second detection signals from output signals of the photodiodes that have received lights passing through the light transmitting sections, a phase of the second detection signal being shifted by a ¼ period of the first detection signal relative to the first detection signal.

4 Claims, 11 Drawing Sheets

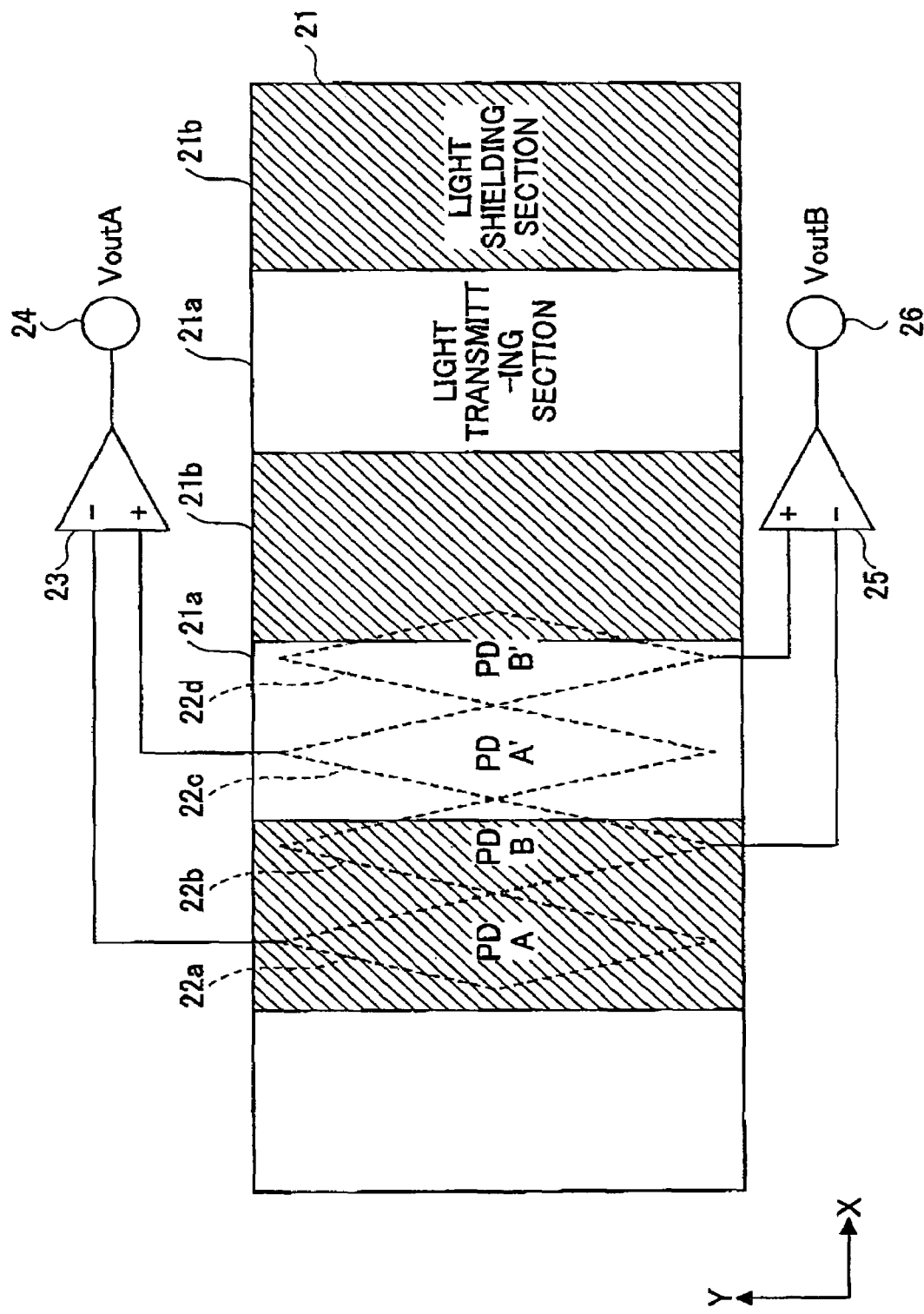

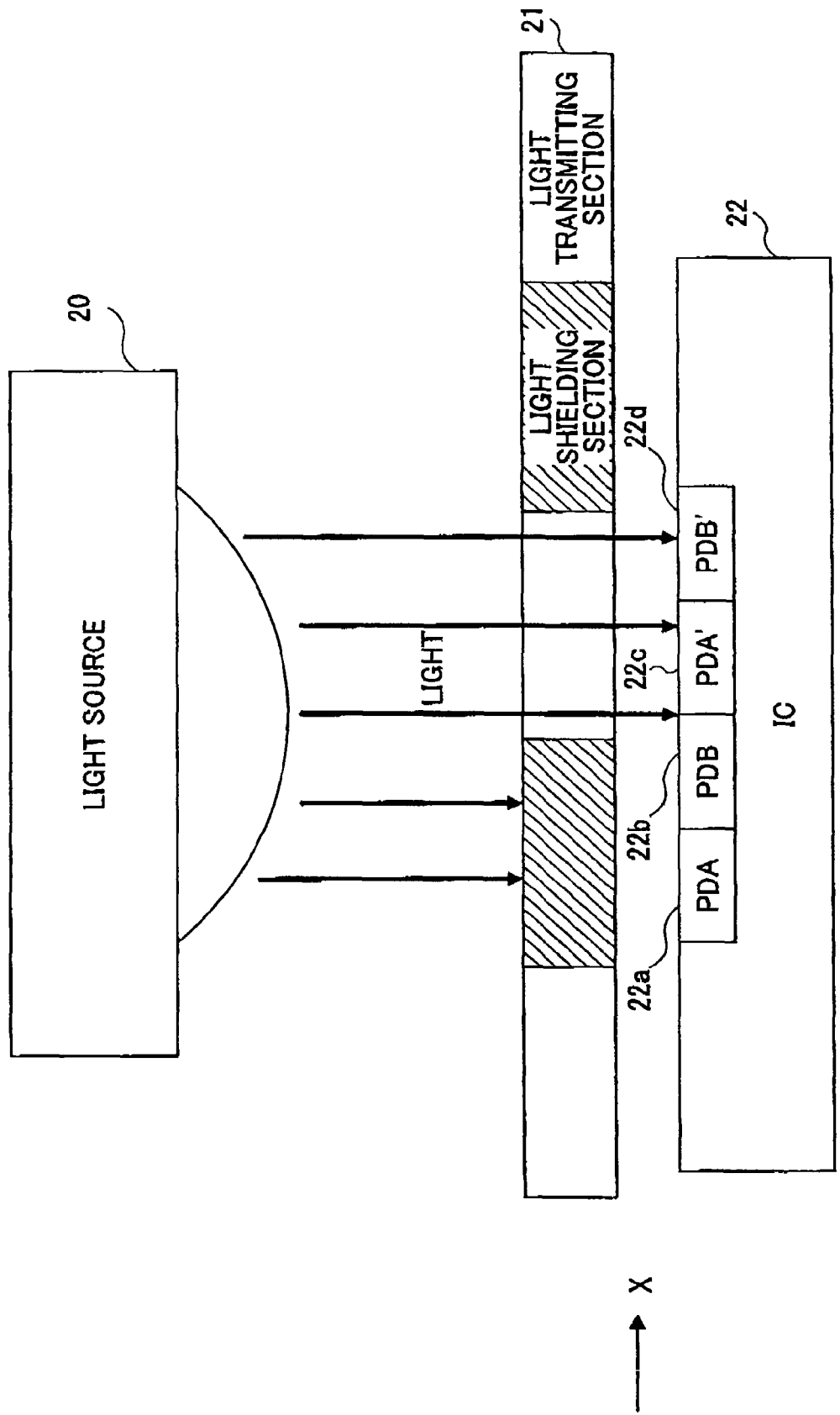

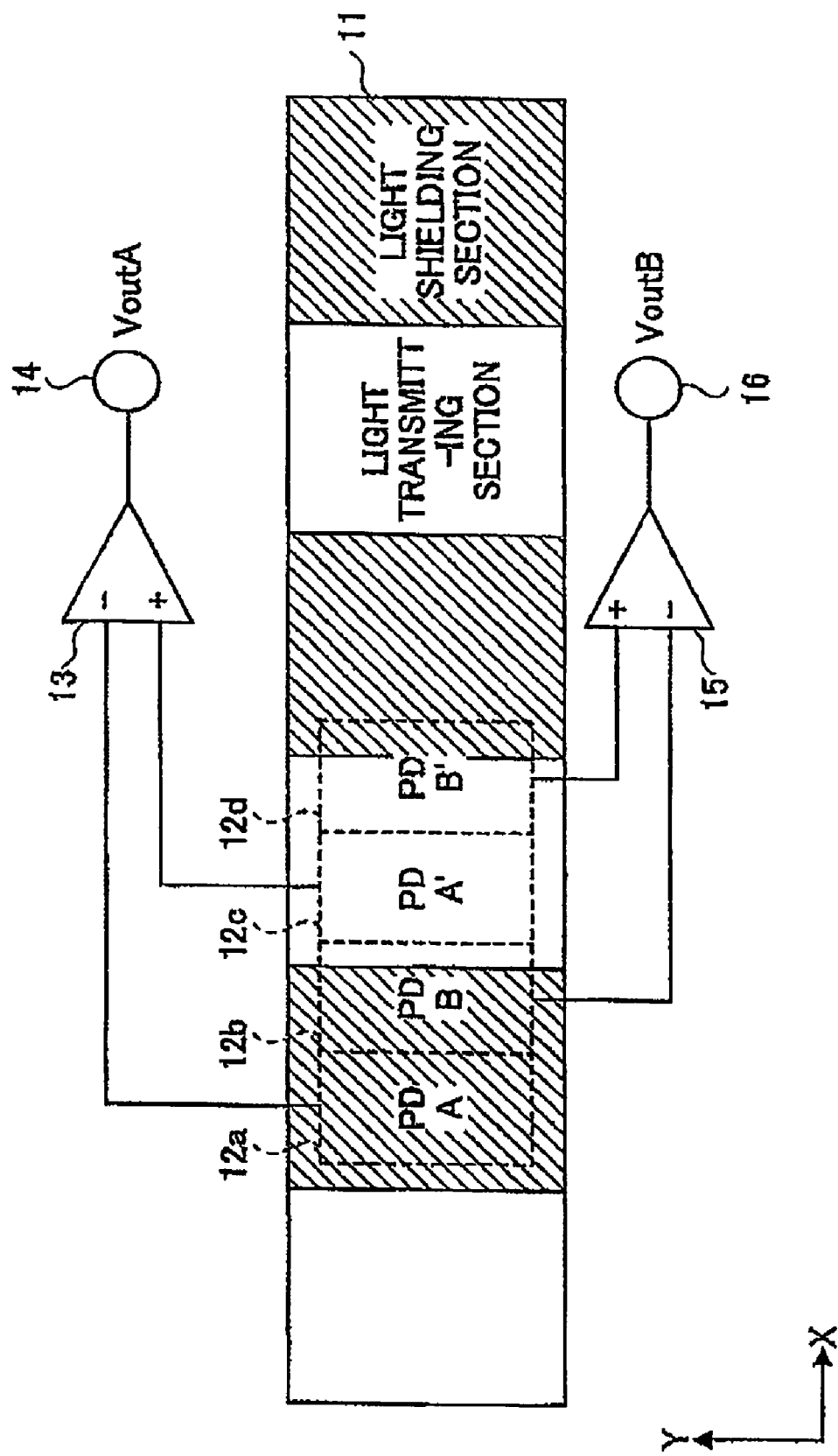

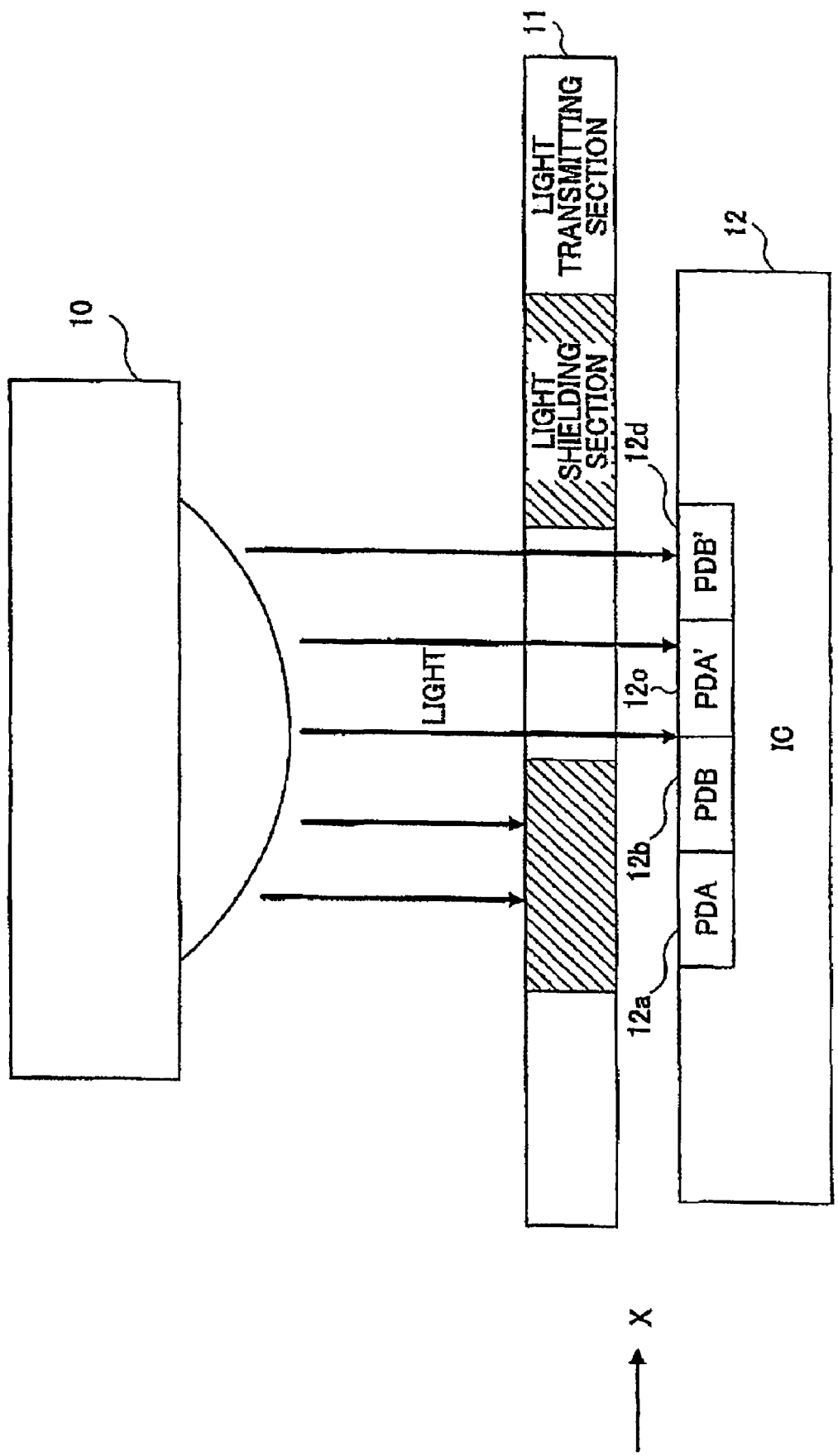

ENCODER DEVICE FOR DETECTING MOVEMENT

BACKGROUND OF THE INVENTION

1. Field of the Invention

The present invention generally relates to an encoder device, and particularly relates to an encoder device that detects movement of an object to be measured and generates pulses corresponding to the movement of the object.

2. Description of the Related Art

Encoder devices for generating pulses corresponding to movements of objects to be measured have long been used as devices for detecting linear motion, rotary motion, etc., of objects to be measured and inputting the detection results into digital devices such as computers.

FIGS. 6A and 6B are a plan view and a side view, respectively, each schematically showing a configuration of a related art encoder device. With reference to FIGS. 6A and 6B, the encoder device comprises a light source 10, a slit member 11, and an integrated circuit 12.

The light source 10 is disposed spaced apart from and facing the integrated circuit 12. The slit member 11 is interposed between the light source 10 and the integrated circuit 12, and is movable with respect to the light source 10 and the integrated circuit 12 in an X direction (leftward and rightward). The slit member 11 is fixed to an object to be measured, and moves in the X direction along with motion of the object.

Referring to a plan view of FIG. 7, the integrated circuit 12 includes photodiodes 12a, 12b, 12c, and 12d which are adjacent to each other in the X direction. Each of the photodiodes 12a, 12b, 12c, and 12d has a length of X1 in the X direction and a width of Y1 in a Y direction. Light receiving areas of the photodiodes 12a, 12b, 12c, and 12d are equal to each other.

Referring to a plan view of FIG. 8, the slit member 11 includes light transmitting sections 11a and light shielding sections 11b which are alternately adjacent to each other in the X direction. Each of the light transmitting sections 11a and the light shielding sections 11b has a length of 2×X1 in the X direction and a width of Y1+α (>Y1) in the Y direction.

Referring back to FIG. 6A, output signals of the photodiodes 12a and 12c are compared by a comparator 13, and the comparison result is output as a detection signal from a terminal 14. Output signals of the photodiodes 12b and 12d are compared by a comparator 15, and the comparison result is output as a detection signal from a terminal 16.

When the slit member 11 moves rightward in the X direction with respect to the integrated circuit 12, the incident light intensities on the photodiodes 12a, 12b, 12c, and 12d change as shown in (A), (B), (C), and (D), respectively, of FIG. 9.

Thus, the output signal of the comparator 13 and the output signal of the comparator 15 change as shown in (E) and (F), respectively, of FIG. 9, wherein the waveform of the output signal of the comparator 15 is delayed by a ¼ period relative to the waveform of the output signal of the comparator 13. On the other hand, when the slit member 11 moves leftward in the X direction with respect to the integrated circuit 12, the waveform of the output signal of the comparator 15 is advanced by a ¼ period relative to the waveform of the output signal of the comparator 13.

Incidentally, Japanese Patent Laid-Open Publication No. 6-18290 discloses an encoder device comprising a member that moves in a direction of an array of openings, a light receiving element that detects lights passing through the openings, and a signal processor that generates output pulses corresponding to detection outputs from light receivers of the light receiving element.

As shown in (A) of FIG. 9, when the slit member 11 moves rightward in the X direction relative to the integrated circuit 12 at a constant velocity, the incident light intensity on the photodiode 12a monotonically increases for a time period τ, is maximized for the next time period τ, and then monotonically decreases for the next time period τ. Meanwhile, as shown in (C) of FIG. 9, the incident light intensity on the photodiode 12c monotonically decreases for a time period τ, is minimized for the next time period τ, and monotonically increases for the next time period τ.

The detection signal output from the comparator 13 shown in (E) of FIG. 9 falls at the point when the incident light intensity on the photodiode 12c falls below the incident light intensity on the photodiode 12a. Because of monotonic increase and decrease of the input signals to the comparator 13, a time fluctuation, i.e., jitter on the falling edge of the detection signal output from the comparator 13 is large. For the same reason, jitter on the on the rising edge is also large. Similarly, jitter on the rising and falling edges of the detection signal output from the comparator 15 shown in (F) is large.

SUMMARY OF THE INVENTION

In view of the forgoing, the present invention is directed to an encoder device capable of reducing jitter on rising and falling edges of a detection signal.

According to an aspect of the present invention, there is provided an encoder device that comprises first through fourth photodiodes each having a rhombus shape and a length of X1 in an X direction, the first through fourth photodiodes being disposed adjacent to each other in the X direction such that a line passing through a pair of opposing vertices of the rhombus shape of each of the first through fourth photodiodes is parallel to an X axis; a slit member that includes light transmitting sections and light shielding sections alternately arranged, and is movable in the X direction, each of the light transmitting sections and the light shielding sections having a length of 2×X1 in the X direction; and a logic circuit that generates a first detection signal and a second detection signal from output signals of the first through fourth photodiodes that have received lights passing through the light transmitting sections, a phase of the second detection signal being shifted by a ¼ period of the first detection signal relative to the first detection signal. With this configuration, jitter on rising and falling edges of a detection signal can be reduced.

It is preferable that the width of each of the light transmitting sections and the light shielding sections of the above-described encoder device in a Y direction perpendicular to the X direction be greater than the width of each of the first through fourth photodiodes in the Y direction.

It is also preferable that the logic circuit of the above-described encoder device include a first comparator that generates the first detection signal by comparing the output signal of the first photodiode and the output signal of the third photodiode; and a second comparator that generates the second detection signal by comparing the output signal of the second photodiode and the output signal of the fourth photodiode.

It is also preferable that plural sets of the first through fourth photodiodes be provided adjacent to each other in the X direction in the above-described encoder device.

BRIEF DESCRIPTION OF THE DRAWINGS

FIGS. 1A and 1B are a plan view and a side view, respectively, each schematically showing a configuration of an encoder device according to an embodiment of the present invention;

FIGS. 6A and 6B are a plan view and a side view, respectively, each schematically showing a configuration of a related art encoder device;

DETAILED DESCRIPTION OF THE PREFERRED EMBODIMENT

The following describes preferred embodiments of the present invention with reference to the accompanying drawings.

FIGS. 1A and 1B are a plan view and a side view each schematically showing a configuration of an encoder device according to an embodiment of the present invention. With reference to FIGS. 1A and 1B, the encoder device comprises a light source 20, a slit member 21, and an integrated circuit 22.

The light source 20 is disposed spaced apart from and facing the integrated circuit 22. The slit member 21 is interposed between the light source 20 and the integrated circuit 22, and is movable with respect to the light source 20 and the integrated circuit 22 in an X direction (leftward and rightward). The slit member 21 is fixed to an object to be measured, and moves in the X direction along with linear motion, rotational motion, etc., of the object.

Figure 2:
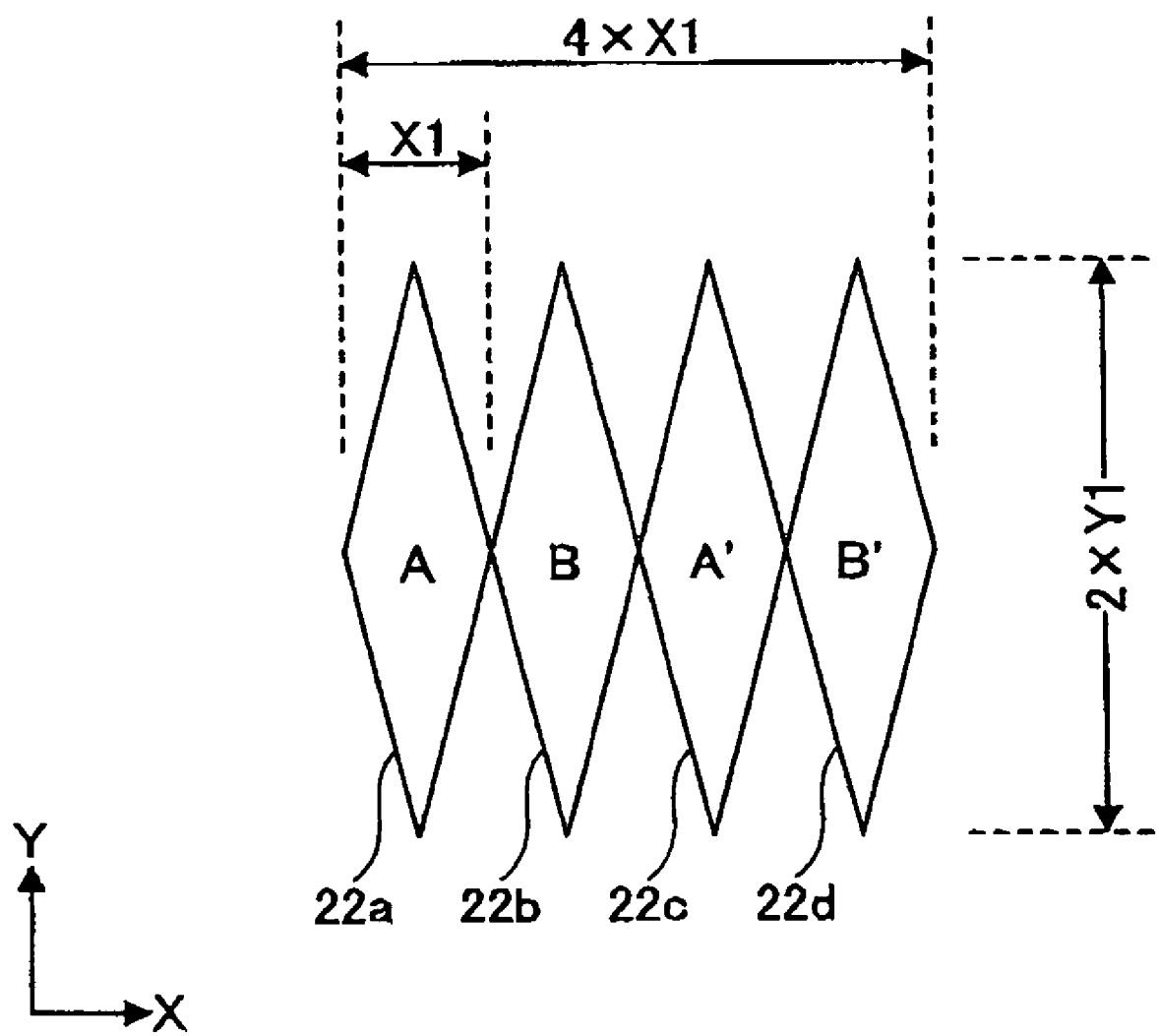
FIG. 2 is a plan view schematically showing an integrated circuit according to an embodiment of the present invention.

Referring to a plan view of FIG. 2, the integrated circuit 22 includes photodiodes 22a, 22b, 22c, and 22d each having a rhombus shape. The photodiodes 22a-22d are disposed adjacent to each other in the X direction such that a line passing through a pair of opposing vertices of each of the rhombus-shaped photodiodes 22a-22d is parallel to the X axis. Each of the photodiodes 22a-22d may alternatively have a square shape. Each of the photodiodes 22a-22d has a length of X1 in the X direction and a width of 2×Y1 in a Y direction perpendicular to the X direction. Light receiving areas of the photodiodes 22a-22d are equal to each other.

Figure 3:
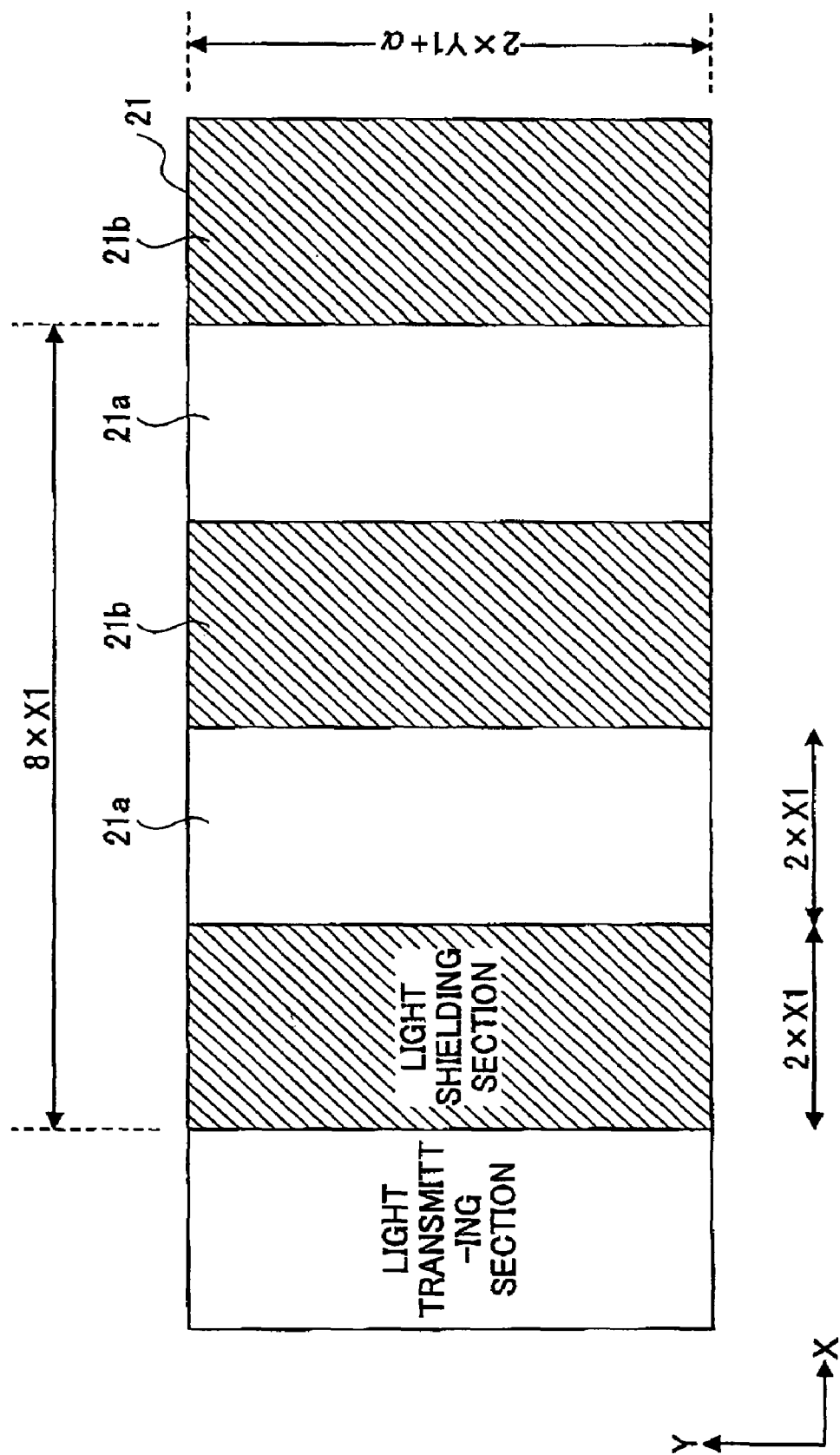
FIG. 3 is a plan view schematically showing a slit member according to an embodiment of the present invention.

Referring to a plan view of FIG. 3, the slit member 21 includes light transmitting sections 21a and light shielding sections 21b which are alternately adjacent to each other in the X direction. Each of the light transmitting sections 21a and the light shielding sections 21b has a length of 2×X1 in the X direction and a width of 2×Y1+α (>2×Y1) in the Y direction.

Referring back to FIG. 1A, output signals of the photodiodes 22a and 22c are compared by a comparator 23, and the comparison result is output as a detection signal from a terminal 24. Output signals of the photodiodes 22b and 22d are compared by a comparator 25, and the comparison result is output as a detection signal from a terminal 26.

Figure 4:
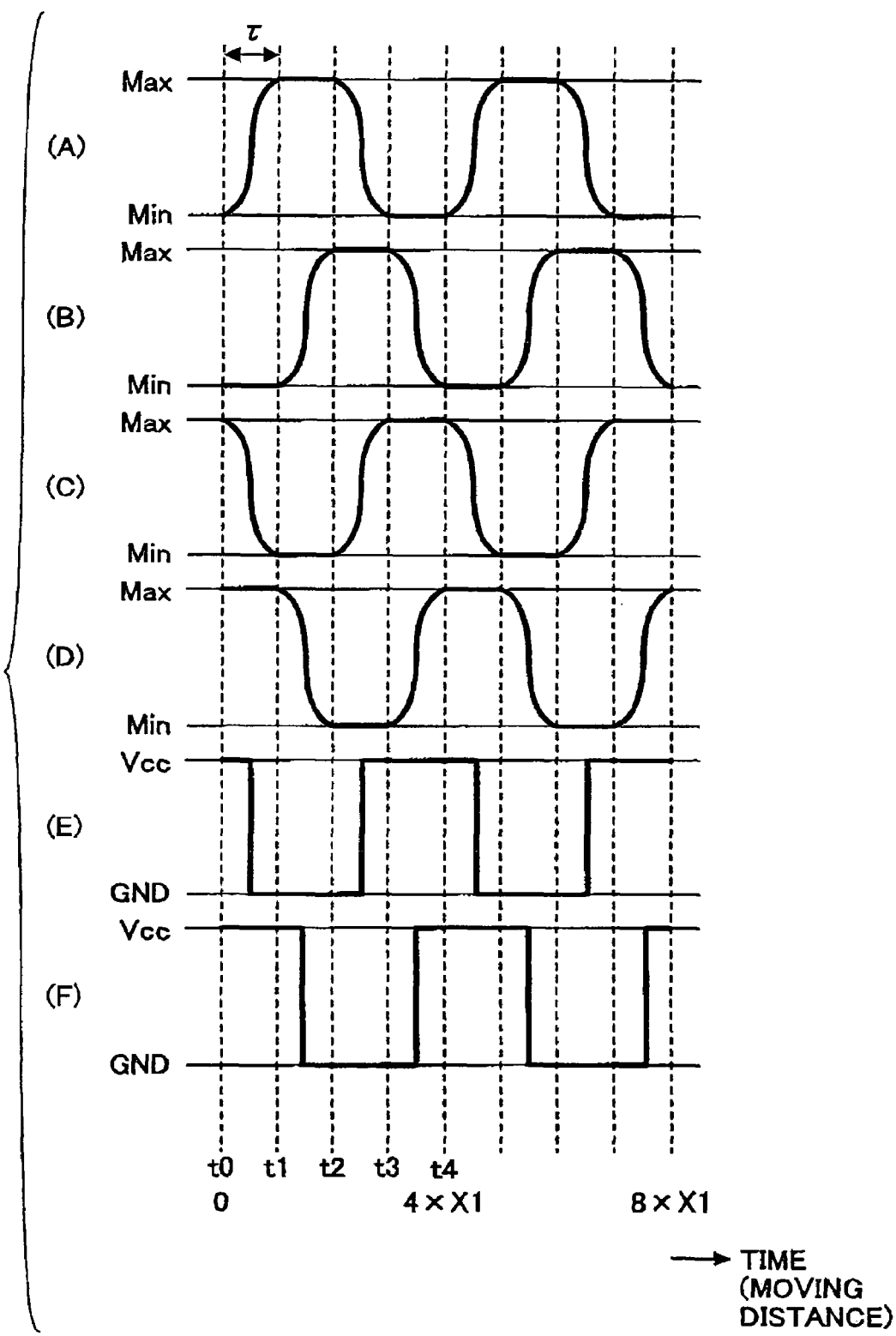
FIG. 4 is a signal waveform chart showing waveforms generated in the encoder device of FIGS. 1A and 1B.

As shown in (A) of FIG. 4, when the slit member 21 moves rightward in the X direction relative to the integrated circuit 22 at a constant velocity, the rate of increase of the incident light intensity on the photodiode 22a gradually increases for a time period $\tau/2$ from time t0, is maximized at the point when the time period $\tau/2$ has passed from time t0, and gradually decreases until a time period $\tau$ has passed from time t0. The rate of reduction of the incident light intensity on the photodiode 22a gradually increases for a time period $\tau/2$ from time t2, is maximized at the point when the time period $\tau/2$ has passed from time t2, and gradually decreases until a time period $\tau$ has passed from time t2.

Meanwhile, as shown in (C) of FIG. 4, the rate of reduction of the incident light intensity on the photodiode 22c gradually increases for the time period $\tau/2$ from time t0, is maximized at the point when the time period $\tau/2$ has passed from time t0, and gradually decreases until the time period $\tau$ has passed from time t0. The rate of increase of the incident light intensity on the photodiode 22c gradually increases for the time period $\tau/2$ from time t2, is maximized at the point when the time period $\tau/2$ has passed from time t2, and gradually decreases until the time period $\tau$ has passed from time t2.

Thus, the detection signal output from the comparator 23 shown in (E) of FIG. 4 quickly falls at the point when the time period $\tau/2$ has passed from time t0, and quickly rises at the point when the time period $\tau/2$ has passed from time t2. Therefore, jitter on the rising and falling edges of the detection signal is significantly reduced.

Similarly, as shown in (B) of FIG. 4, when the slit member 21 moves rightward in the X direction relative to the integrated circuit 22 at a constant velocity, the rate of increase of the incident light intensity on the photodiode 22b gradually increases for a time period $\tau/2$ from time t1, is maximized at the point when the time period $\tau/2$ has passed from time t1, and gradually decreases until a time period $\tau$ has passed from time t1. The rate of reduction of the incident light intensity on the photodiode 22b gradually increases for a time period $\tau/2$ from time t3, is maximized at the point when the time period $\tau/2$ has passed from time t3, and gradually decreases until a time period $\tau$ has passed from time t3.

Meanwhile, as shown in (D) of FIG. 4, the rate of reduction of the incident light intensity on the photodiode 22d gradually increases for the time period $\tau/2$ from time t1, is maximized at the point when the time period $\tau/2$ has passed from time t1, and gradually decreases until the time period $\tau$ has passed from time t1. The rate of increase of the incident light intensity on the photodiode 22d gradually increases for the time period $\tau/2$ from time t3, is maximized at the point when the time period $\tau/2$ has passed from time t3, and gradually decreases until the time period $\tau$ has passed from time t3.

Thus, the detection signal output from the comparator 25 shown in (F) of FIG. 4 quickly falls at the point when the time period $\tau/2$ has passed from time t1, and quickly rises at the point when the time period $\tau/2$ has passed from time t3. Therefore, jitter on the rising and falling edges of the detection signal is significantly reduced.

Figure 5:
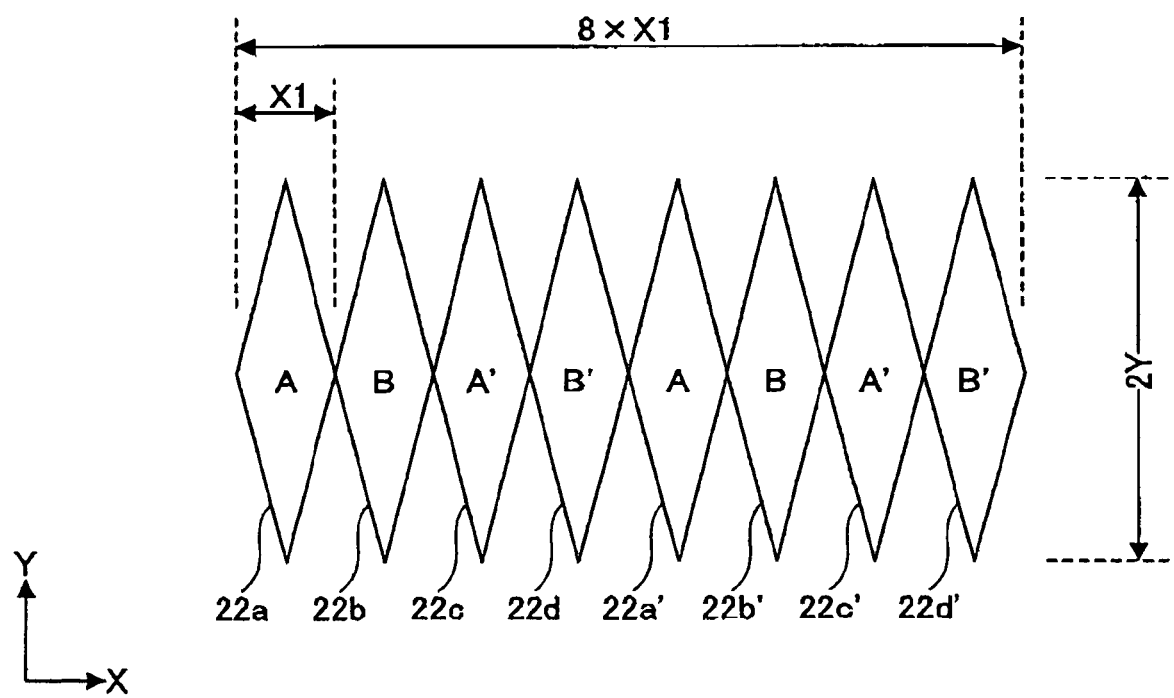
FIG. 5 is a plan view schematically showing an integrated circuit according to an embodiment of the present invention.
Figure 7:
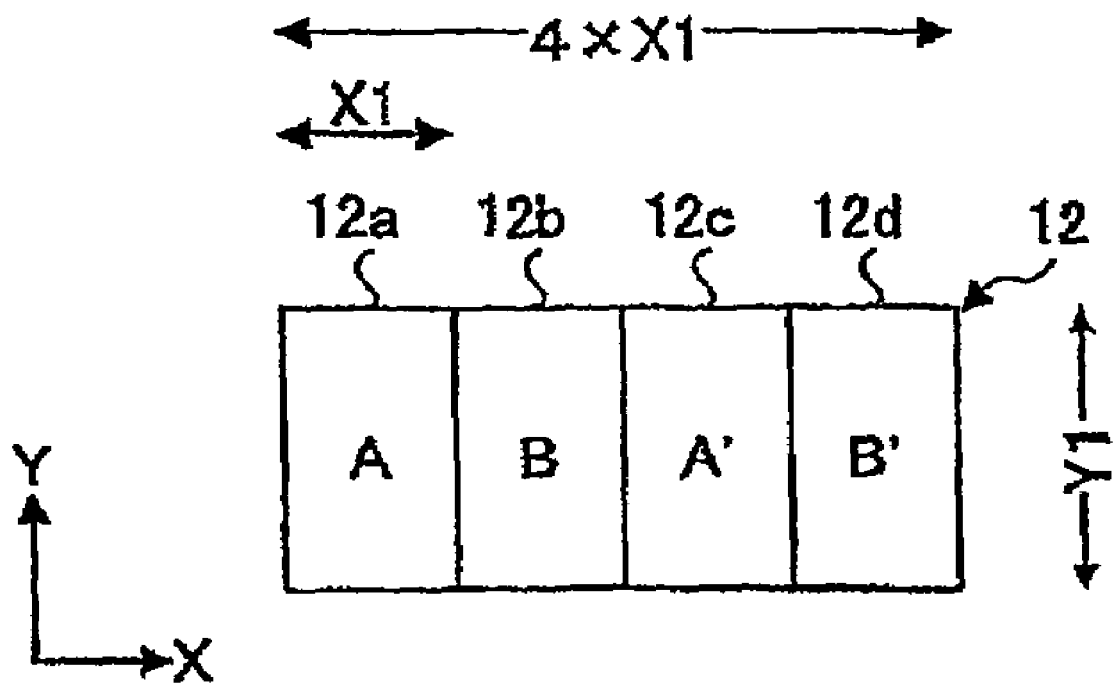
FIG. 7 is a plan view schematically showing a related art integrated circuit.
Figure 8:
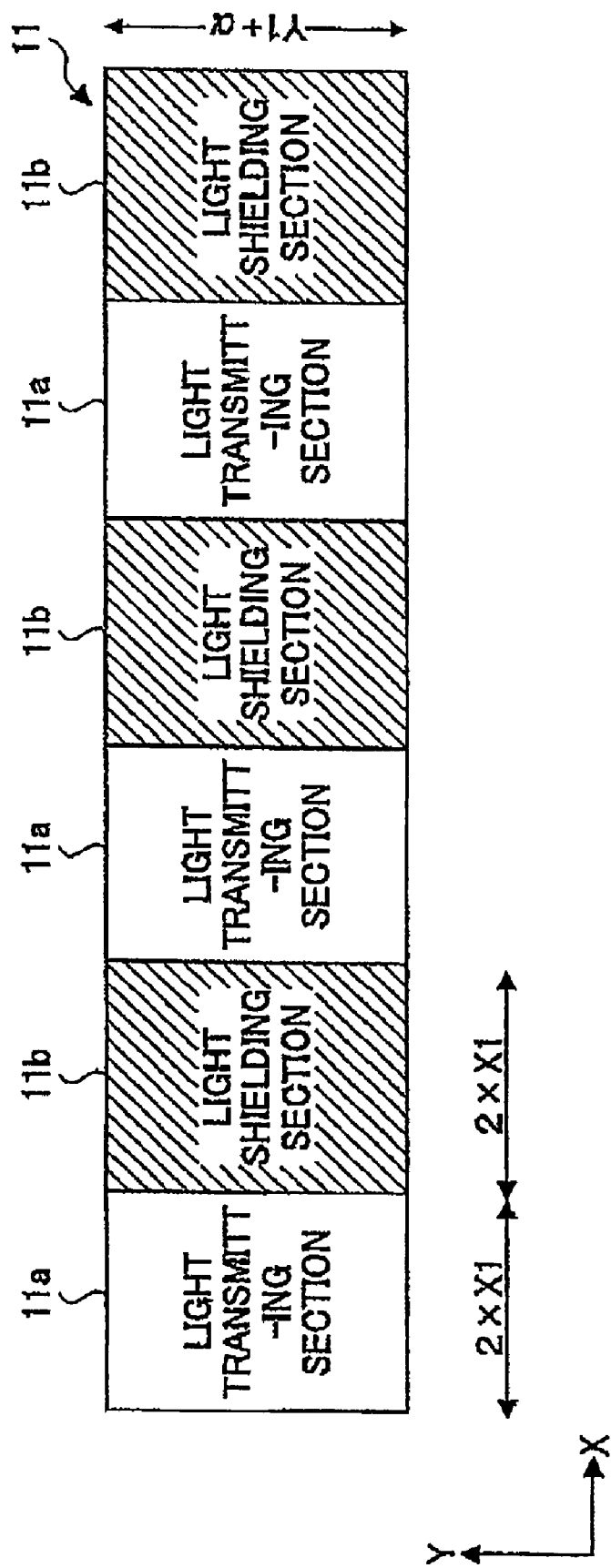
FIG. 8 is a plan view schematically showing a related art slit member.
Figure 9:
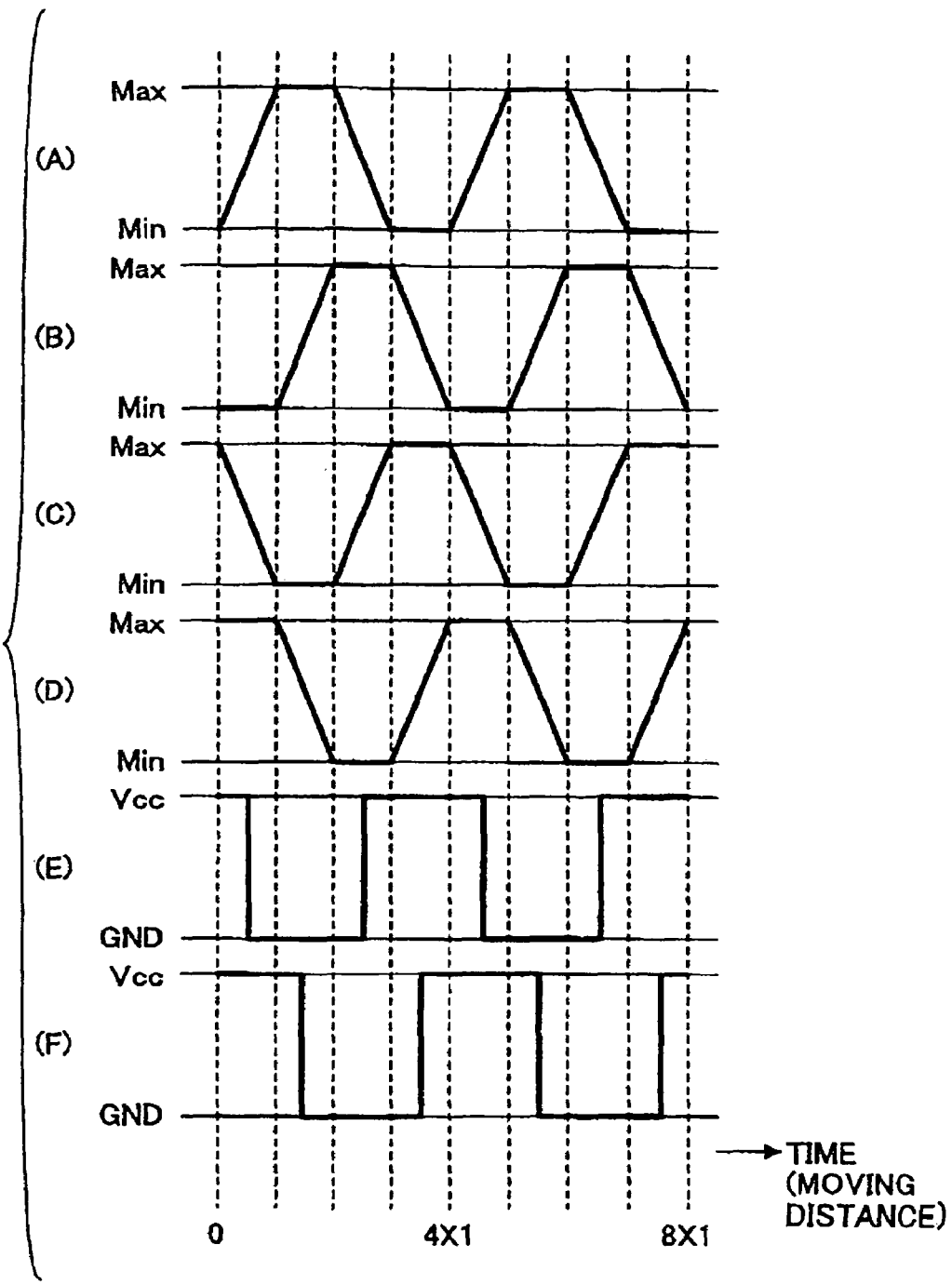
FIG. 9 is a signal waveform chart showing waveforms generated in the encoder device of FIGS. 6A and 6B.

In an alternative embodiment shown in a plan view of FIG. 5, photodiodes 22a, 22b, 22c, 22d, 22a', 22b', 22c', and 22d' are provided adjacent to each other in the X direction. Each of the photodiodes 22a-22d and 22a'-22d' has a rhombus shape. A line passing through a pair of opposing vertices of each of the rhombus-shaped photodiodes 22a-22d and 22a'-22d' extends in the X direction. Each of the photodiodes 22a-22d and 22a'-22d' has a length of X1 in the X direction and a width of 2×Y1 in the Y direction. Light receiving areas of the photodiodes 22a-22d and 22a'-22d' are equal to each other. Outputs of the photodiodes 22a'-22d' are added to outputs of the corresponding photodiodes 22a-22d and then output to the corresponding comparators 23 and 25. This configuration can reduce variation of the incident light intensities due to difference in position of photodiodes.

It is to be noted that the photodiodes 22a-22d correspond to first-fourth diodes in the appended claims, and the comparators 23 and 25 correspond to a logic circuit in the appended claims.

The present application is based on Japanese Priority Application No. 2005-190137 filed on Jun. 29, 2005, with the Japanese Patent Office, the entire contents of which are hereby incorporated by reference.

What is claimed is:

1. An encoder device comprising:
   first through fourth photodiodes each having a rhombus shape and a length of X1 in an X direction, the first through fourth photodiodes being disposed adjacent to each other in the X direction such that a line passing through a pair of opposing vertices of the rhombus shape of each of the first through fourth photodiodes is parallel to an X axis;
   a slit member that includes light transmitting sections and light shielding sections alternately arranged, and is movable in the X direction, each of the light transmitting sections and the light shielding sections having a length of 2×X1 in the X direction; and
   a logic circuit that generates a first detection signal and a second detection signal from output signals of the first through fourth photodiodes that have received lights passing through the light transmitting sections, a phase of the second detection signal being shifted by a ¼ period of the first detection signal relative to the first detection signal.

2. The encoder device as claimed in claim 1, wherein a width of each of the light transmitting sections and the light shielding sections in a Y direction perpendicular to the X direction is greater than a width of each of the first through fourth photodiodes in the Y direction.

3. The encoder device as claimed in claim 1, wherein the logic circuit includes
   a first comparator that generates the first detection signal by comparing the output signal of the first photodiode and the output signal of the third photodiode; and
   a second comparator that generates the second detection signal by comparing the output signal of the second photodiode and the output signal of the fourth photodiode.

4. The encoder device as claimed in claim 1, wherein a plurality of sets of the first through fourth photodiodes are provided adjacent to each other in the X direction.

* * * * *